United States Patent [19]
Ahlert et al.

[11] Patent Number: 5,227,212
[45] Date of Patent: Jul. 13, 1993

[54] MAGNETIC RECORDING DISK, MAGNETORESISTIVE READ HEAD, INDUCTIVE WRITE HEAD COMBINATION

[75] Inventors: Richard H. Ahlert, San Jose; James K. Howard, Morgan Hill; Steven E. Lambert, San Jose; Ian L. Sanders, Morgan Hill, all of Calif.

[73] Assignee: International Business Machines Corporation, Armonk, N.Y.

[21] Appl. No.: 739,565

[22] Filed: Aug. 2, 1991

Related U.S. Application Data

[63] Continuation-in-part of Ser. No. 324,374, Mar. 16, 1989, Pat. No. 5,051,288.

[51] Int. Cl.$^5$ .............................................. G11B 5/00
[52] U.S. Cl. ........................ 360/97.01; 428/900; 428/928; 428/64; 428/694 TM; 428/667; 360/103; 360/113; 360/135
[58] Field of Search .................. 360/97.01, 106, 113, 360/135, 103; 428/64, 65, 694, 695, 900

[56] References Cited

U.S. PATENT DOCUMENTS

| | | | |
|---|---|---|---|
| 3,908,194 | 9/1975 | Ramonkiw | 360/113 |
| 4,167,765 | 9/1979 | Watrous | 360/103 |
| 4,706,138 | 11/1987 | Jove et al. | 360/67 |
| 4,786,993 | 11/1988 | Jove et al. | 360/67 |
| 4,894,740 | 1/1990 | Chhabra et al. | 360/103 |

OTHER PUBLICATIONS

Katayama, S. et al. "Magnetic Properties and Read Write Characteristics of Multilayer Films on a Glass Substrate" IEEE Transactions on Magnetics, vol. 24, No. 6, Nov. 1988.

Hata, et al., "Low-Noise Media Using Double-layer CoNiCr Thin Films For Longitudinal Recording," J. Appl. Phys. 67(9), 1 May 1990, pp. 4692-4694.

Murdock, et al., "Noise Properties of Multilayered Co-alloy Magnetic Recording Media," IEEE Trans. on Magnetics, vol. 26, No. 5, Sep. 1990, pp. 2700-2705.

Lambert, et al., "Reduction of Media Noise in Thin Film Metal Media By Lamination," IEEE Trans on Magnetics, vol. 26, No. 5, Sep. 1990, pp. 2706-2708.

Primary Examiner—Paul J. Thibodeau
Assistant Examiner—Steven A. Resan
Attorney, Agent, or Firm—Thomas R. Berthold

[57] ABSTRACT

An improved CoPt based or CoNi based alloy magnetic recording disk for horizontal recording has a magnetic recording layer which is a laminated structure of relatively thin magnetic alloy films separated by relatively thin non-magnetic spacer films. The resulting laminated disk structure has substantially decreased intrinsic media noise at high linear recording densities. A magnetic recording disk drive uses the low noise laminated disk and and a magnetoresistive read sensor to provide a disk drive with significantly reduced noise in the data readback signal.

16 Claims, 5 Drawing Sheets

MAGNETIC RECORDING DISK, MAGNETORESISTIVE READ HEAD, INDUCTIVE WRITE HEAD COMBINATION

BACKGROUND OF THE INVENTION

Related Application

This application is a continuation-in-part of application Ser. No. 07/324,374 filed Mar. 16, 1989 and issued as U.S. Pat. No. 5,051,288.

TECHNICAL FIELD

This invention relates to thin film metal alloy magnetic recording disks for horizontal recording, and in particular to a CoPt alloy or CoNi alloy disk having low intrinsic media noise at high linear recording density. The invention is also a magnetic recording disk drive which uses a magnetoresistive (MR) read sensor in cooperation with the improved media to provide a low noise readback signal.

DESCRIPTION OF THE PRIOR ART

One of the problems with thin film metal alloy media, including CoPt alloy and CoNi alloy media, is that the intrinsic media noise increases with increasing linear recording density. Media noise arises from irregularities in the magnetic transitions and results in random shifts of the readback signal peaks. These random shifts are referred to as "peak jitter" or "time jitter". Thus, the higher the media noise, the higher the bit error rate. It is therefore desirable to develop a thin film metal alloy media which generates noise below a maximum acceptable level in order that data can be recorded at maximum linear density. The effect of intrinsic media noise, as measured by peak jitter and media signal-to-noise ratio (SNR), on the bit error rate in magnetic recording systems is described by Katz, et al., in "Effect of Bitshift Distribution on Error Rate in Magnetic Recording", *IEEE Trans. on Magnetics.* Vol. MAG-15, pp. 1050-1053, 1979. The measurement of media SNR is described by Belk, et al., in "Measurement of the Intrinsic Signal-to-Noise Ratio for High Performance Rigid Recording Media", *J. Appl. Physics*, 59(2), Jan. 15, 1986, pp. 557-562.

Assignee's U.S. Pat. No. 4,789,598 describes a CoPtCr metal alloy magnetic recording disk wherein the high Cr concentration reduces the intrinsic media noise at high recording density.

The conventional head used in magnetic recording disk drives for reading and writing data on thin film disks is a dual function inductive read/write head. Because such a head must be able to both read and write data, trade-offs must be made in the design of the head and disk parameters in order to optimize both the read and write data signals in the disk drive. Magnetoresistive (MR) read sensors (or "heads") have been proposed to be used with inductive write heads in disk drives. Assignee's U.S. Pat. No. 3,908,194 describes a "piggyback" thin film head which combines an MR read head and an inductive write head. While a disk with intrinsic low media noise is generally desirable for both disk drives which use a dual function inductive head and disk drives which use an MR read/inductive write, it is especially important with the latter because MR read heads are much more sensitive than inductive read heads to the readback signal from the disk. In addition, certain disks which possess low media noise may be less desirable for use with dual function inductive heads because of other adverse magnetic properties which result from or accompany the low media noise.

What is needed is a disk drive which uses an MR read head and a low noise disk and which has an optimized write head and a low noise readback signal.

SUMMARY OF THE INVENTION

The invention is an improved CoPt based or CoNi based alloy magnetic recording disk for horizontal recording wherein the magnetic recording layer in the disk structure is a laminated structure of relatively thin CoPt or CoNi alloy magnetic films separated by relatively thin non-magnetic spacer films.

The resulting laminated disk structure has substantially decreased intrinsic media noise at high linear recording densities. The benefits of improved signal-to-noise ratio (SNR) are best achieved when the non-magnetic spacer film is maintained as thin as possible, i.e. a thickness just sufficient to effectively interrupt the continuous nature of the subsequently deposited magnetic film.

For a fuller understanding of the nature and advantages of the present invention reference should be made to the following detailed description taken in conjunction with the accompanying drawings.

DESCRIPTION OF THE PREFERRED EMBODIMENTS

In order to illustrate the improved SNR for CoPt alloy laminated disks, and the dependence of that improvement on the number and thickness of the films, various types of CoPt alloy disks were fabricated with various types of non-magnetic spacer films.

The disks were prepared in an RF-DC magnetron sputtering system (S-gun). The Ar sputtering pressure was approximately $1 \times 10^{-7}$ Torr before deposition and was maintained at 3.2 m Torr for each deposition. All depositions were conducted without substrate heat. The substrates were $5\frac{1}{4}''$ AlMg/NiP disks. The surfaces of the substrates were RF discharge cleaned and the Mo, Cr, or CrV underlayers (300–400 Angstroms thick) were sputter deposited on the substrates before lamination of the magnetic layer. The magnetic layer was then sputter deposited by alternating the sputtering sources (magnetic film and spacer) to form the laminated structure.

Table 1 depicts the magnetic properties of a single film (550 Angstroms) $Co_{74}Pt_9Cr_{17}$ layer compared to a two-film (2×250 Angstroms) layer separated by a 80 Angstroms thick film of non-magnetic $Cr_{80}V_{20}$.

TABLE 1

|  | Single Layer (550 Angstroms) | Laminated Film (2 × 250 Angstroms) |
| --- | --- | --- |
| $M_r$— | $2.20 \times 10^{-3}$ | $2.15 \times 10^{-3}$ |
| $H_c$ | 1275 Oe | 1315 Oe |
| S | 0.91 | 0.91 |
| S* | 0.90 | 0.83 |

Figure 1:
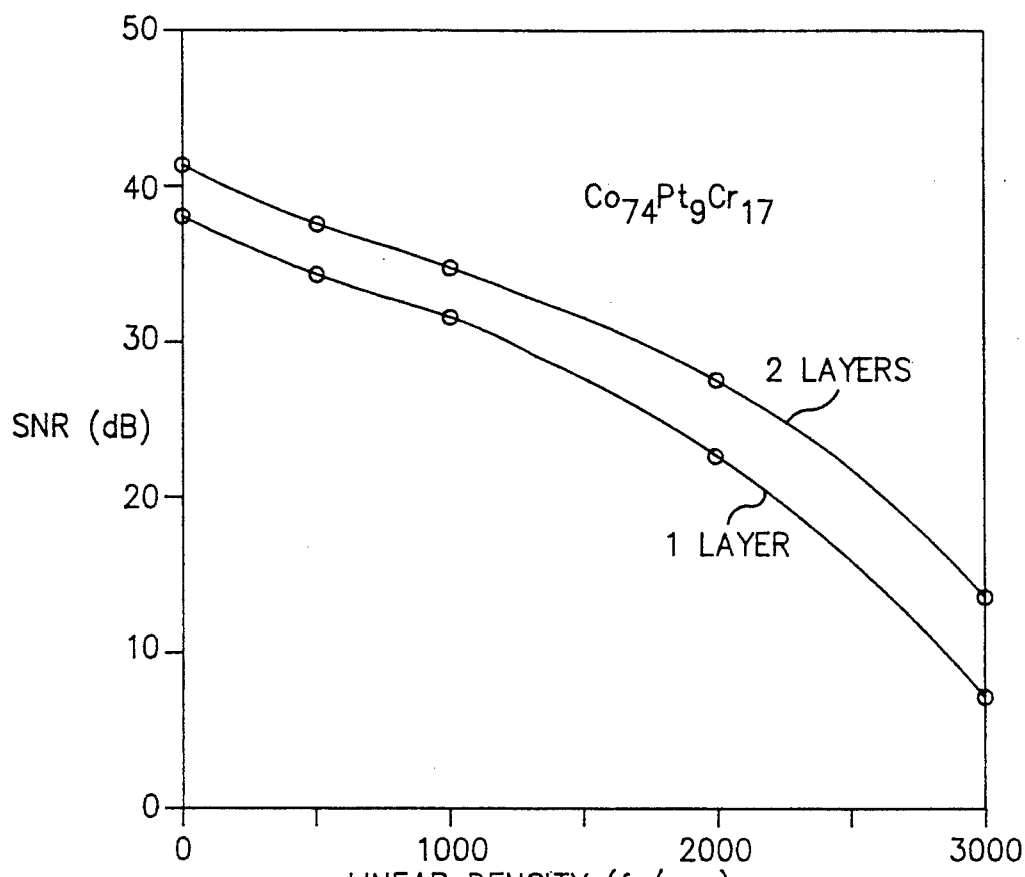
FIG. 1 is a graph of SNR versus linear density for a single layer and a two-layer CoPtCr disk structure.

FIG. 1 is a plot of the SNR (dB) versus linear recording density for the two disks whose data is given in Table 1, where SNR is the ratio of base-to-peak signal amplitude (in microvolts) to RMS media noise (in microvolts). Note that a two-film structure of CoPtCr increases the SNR by about 8–9 dB at 3,000 flux reversals per millimeter (fr/mm). The 80 Angstroms $Cr_{80}V_{20}$ layer which separated the two CoPtCr films had no effect on the isolated readback pulses, thus indicating that the lamination did not adversely affect the recording properties.

Figure 2:
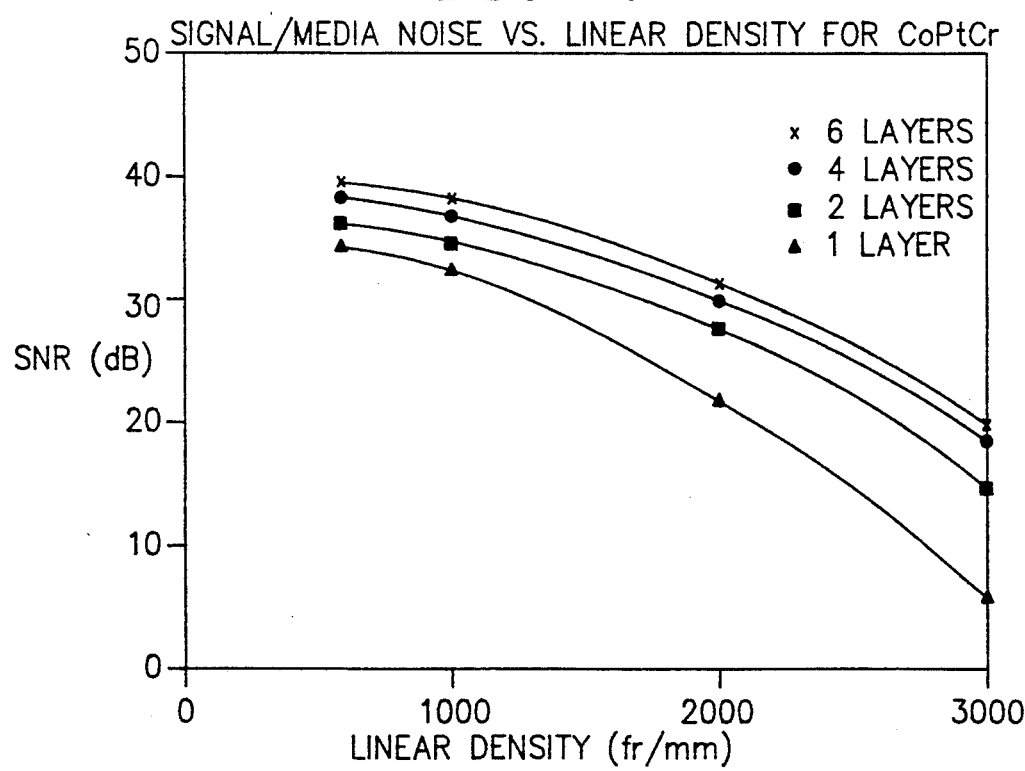
FIG. 2 is a plot of SNR as a function of linear density for different laminated CoPtCr disk structures which illustrate the reduction in noise as the number of films increases.

FIG. 2 depicts the effect of laminating CoPtCr with up to 6 films (6×90 Angstroms) where adjacent films are separated by $Cr_{80}V_{20}$ non-magnetic spacer films (40 Angstroms). A single film structure yielded only about a 5 dB SNR at 3,000 fr/mm, compared to approximately a 20 dB SNR for the 6-film laminated structure.

Figure 3:
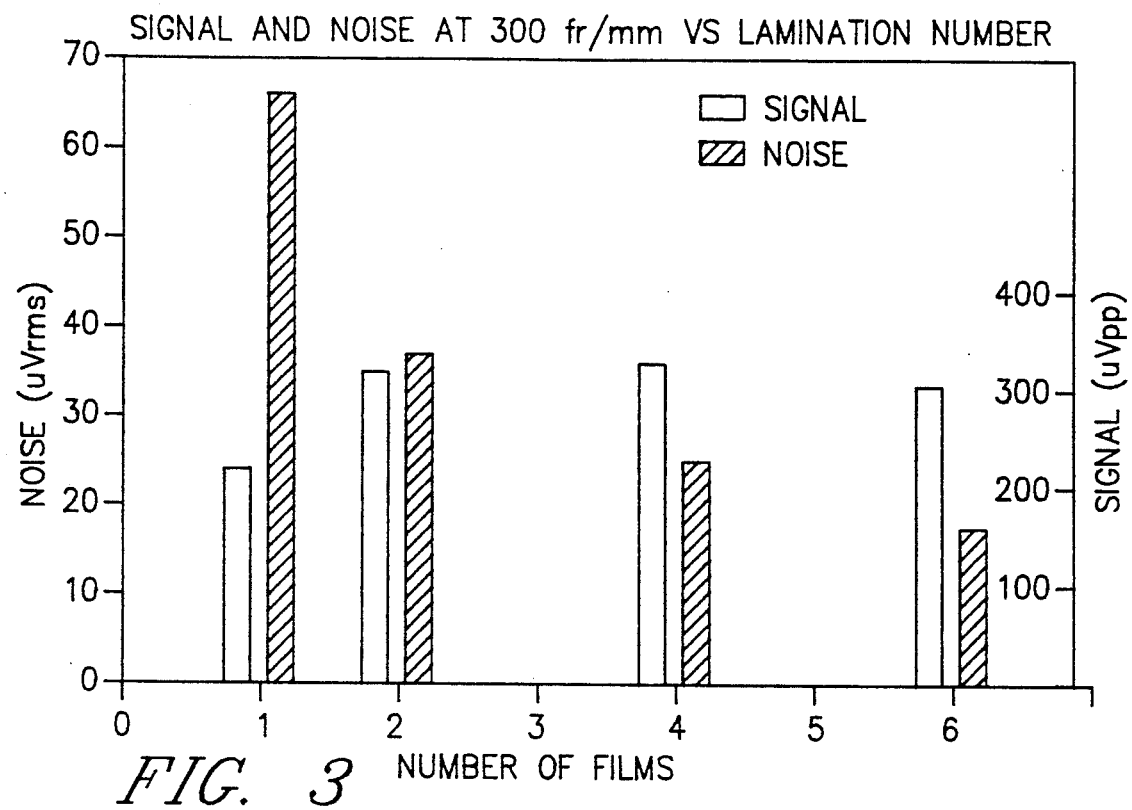
FIG. 3 is a bar chart illustrating the measurements of signal and noise as a function of the number of films in the laminated disk structure.

An overall comparison of the effect of lamination on signal and noise is shown in FIG. 3. As is apparent, the effect of lamination on signal is minimal but the reduction in noise is dramatic as the number of films in the lamination increases.

Figure 4:
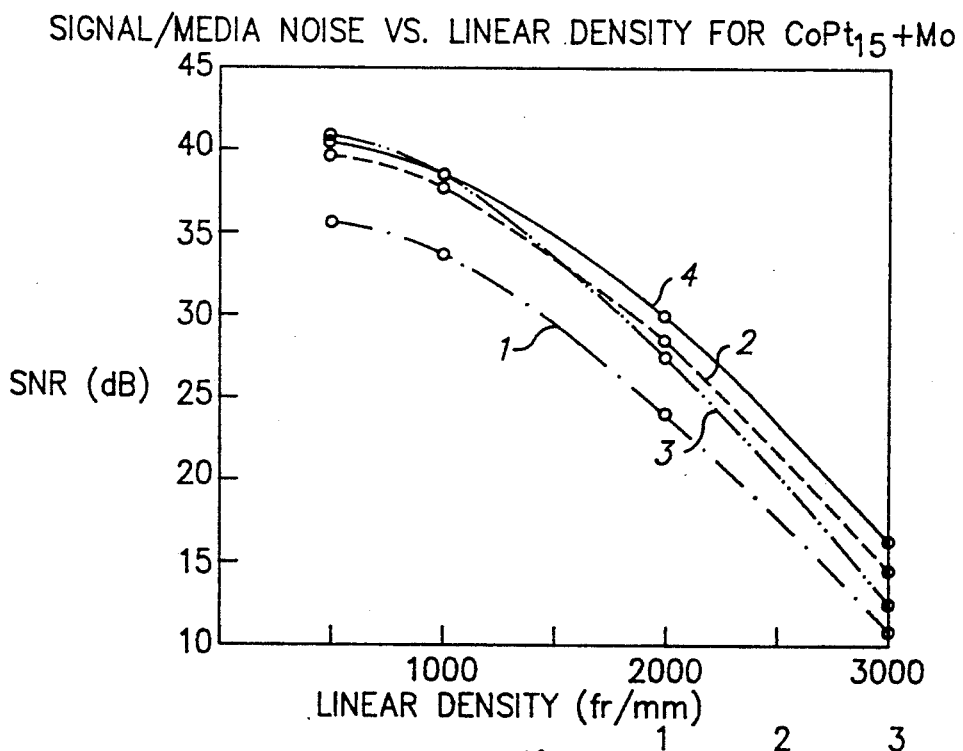
FIG. 4 is a plot of SNR as a function of linear density for a CoPtMo disk illustrating the reduction in media noise with increasing number of films.
Figure 5:
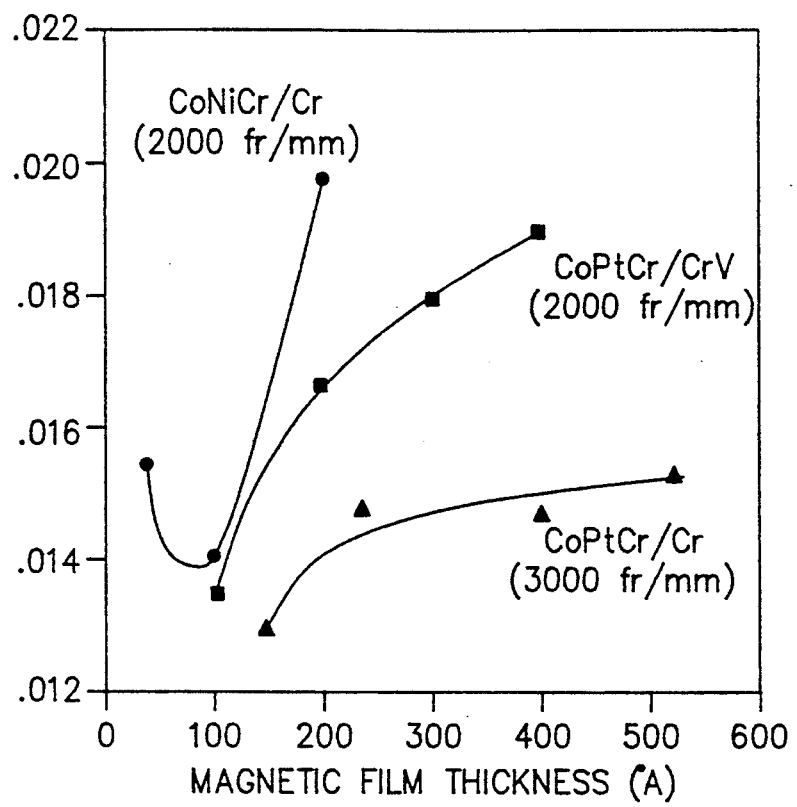
FIG. 5 is a plot of the ratio of media noise to signal amplitude as a function of magnetic film thickness.

FIG. 4 depicts SNR data for a $Co_{68}Pt_{12}Mo_{20}$ disk, laminated with either 80 Angstroms or 40 Angstroms of non-magnetic Mo, as a function of linear density. Note that lamination improves the SNR at 3,000 fr/mm in a manner similar to that for CoPtCr for one and two-film structures (FIG. 1). However, the 3-film structure (3×134 Angstroms) with 80 Angstroms Mo spacer films, was not as good as the 2-film structure. When the Mo spacer thickness was reduced from 80 Angstroms to 40 Angstroms, a SNR improvement was achieved. This indicates it is desirable to have the non-magnetic spacer films as thin as possible, i.e. the minimum thickness sufficient to permit the growth of a magnetic film.

Similar results of improved SNR were obtained for disks where the magnetic films of CoPtCr were also alloyed with Mo and separated by non-magnetic spacer films of Mo (40 Angstroms). Improved results in SNR were also observed for disks made according to the present invention when the spacer films were either Cr, Mo or CrV having thickness values between approximately 40 and 80 Angstroms.

All of the noise measurements referred to herein and depicted in FIGS. 1–5 were made with an MR read sensor.

Figure 6:
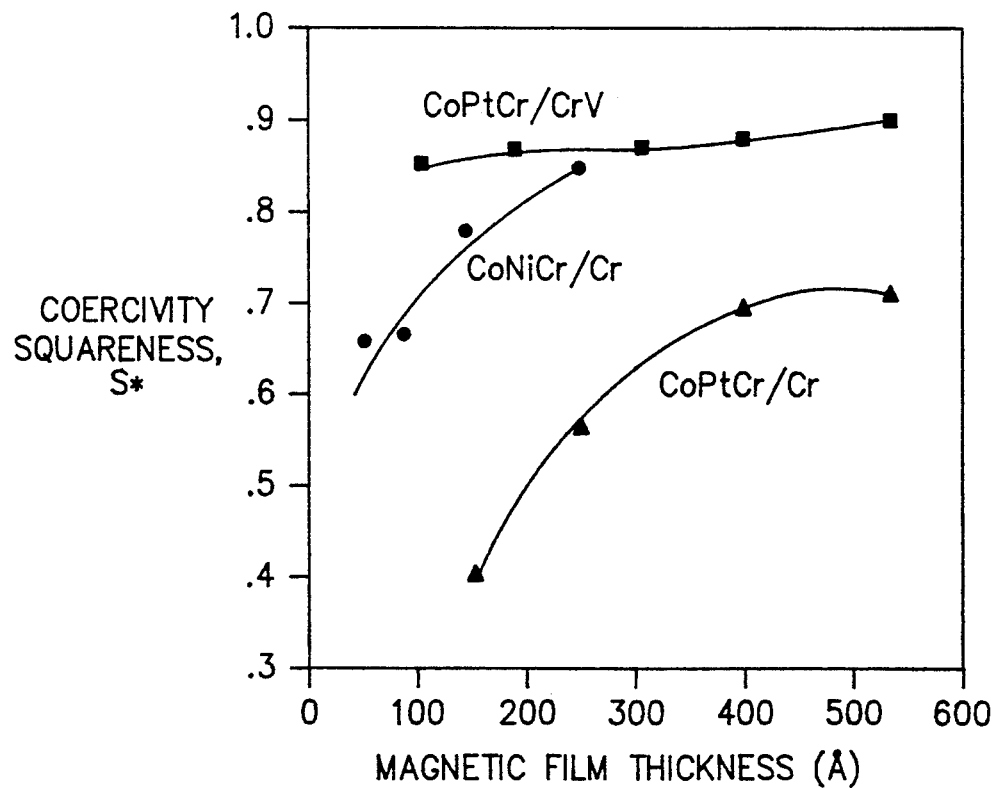
FIG. 6 is a plot of coercivity squareness as a function of magnetic film thickness.

The low-noise laminated thin film CoPt alloy disk made according to the present invention is based upon the discovery that a single thinner CoPt alloy film exhibits superior low-noise characteristics compared to a thicker film. (See FIG. 5, where $S_o$ is zero-to-peak signal amplitude of an isolated transition). It has also been experimentally determined that the improved SNR with a reduction in CoPt alloy film thickness is accompanied by a reduction in coercivity squareness, S* (See FIG. 6). It is believed that the low S* value is indicative of a lesser degree of exchange coupling between grains in the polycrystalline CoPt alloy film. Thus, in the present invention and contrary to conventional thin film CoPt alloy disks, it is desirable to have a lamination of multiple films, where each film has a relatively low value of S*, since this results in low intrinsic media noise. It is apparent, by reference to FIGS. 5 and 6, that this phenomena is also applicable to thin CoNi alloy films. Thus it is believed that the improved low noise media is also possible by lamination of thin CoNi alloy films with thin non-magnetic spacer films.

The above description relates only to the inventive structure which forms a part of the recording media, and not to the conventional well-known portions of the media and the media fabrication processes. For example, in the fabrication of thin film metal alloy disks, it is known to provide a protective overcoat, such as a sputtered carbon film, over the magnetic film. In the present invention the protective overcoat is formed over the uppermost film in the laminated film structure.

The above-described discovery of the correlation between low noise and low S* allows for a substantially improved disk drive using an MR read sensor. Low S* is a generally undesirable property in a disk to be used in a disk drive which uses a dual function inductive head because a disk with low S* typically exhibits lower readback amplitude and is more difficult to write than a similar disk with higher S*. These problems can be overcome using an MR head which has inherently higher readback amplitude combined with an inductive write head optimized to write low S* media. In addition, a dual function inductive head that is designed for writing low S* media will necessarily not be optimized for reading the same low S* media. Also, the benefit of low noise media in disk drives with dual function inductive heads is significantly less than in disk drives with MR heads because in the former the noise from the media is a rather small contribution to the overall noise in the read channel.

Figure 7:
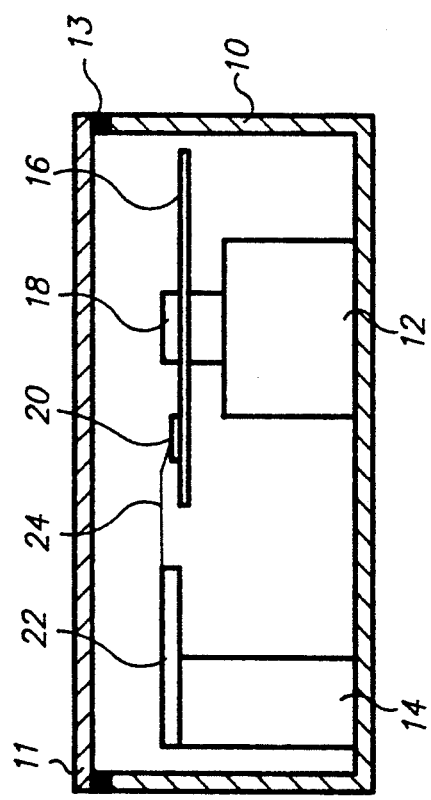
FIG. 7 is a view in section of a schematic of the disk drive of the present invention.
Figure 8:
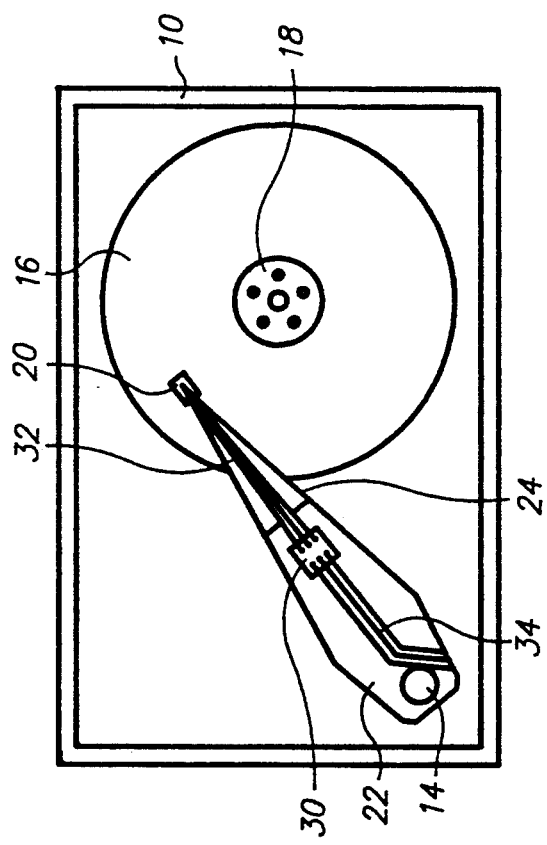
FIG. 8 is an open top view of the disk drive depicted schematically in FIG. 1.

Referring now to FIGS. 7 and 8, there is illustrated a schematic of the disk drive of the present invention. The disk drive comprises a base 10 which supports a disk drive motor 12 (FIG. 7) and an actuator 14, and a cover 11, which has been removed in FIG. 8 to show the interior of the disk drive. The base 10 and cover 11 provide a substantially sealed housing for the disk drive. Typically there is a gasket located between base 10 and cover 11 and a small breather port for equalizing pressure between the interior of the disk drive and the outside environment. This type of disk drive is described as being sealed since the drive motor 12 is located entirely within the housing and there is no external forced air supply for cooling the interior components. The low noise laminated film magnetic recording disk 16, as described above, is mounted on a hub 18, which is attached for rotation by drive motor 12. An MR read/inductive write head is formed on a transducer carrier 20. The carrier 20 may be a conventional air-bearing slider, such as the three-rail slider described in assignees' U.S. Pat. No. 4,894,740, and is connected to the actuator 14 by means of a rigid arm 22 and a suspension 24. The suspension 24, which may be a conventional type of suspension such as that described in assignees' U.S. Pat. No. 4,167,765, provides a biasing force which forces the carrier 20 toward the disk 16 where it is supported by an air-bearing when the disk 16 is rotating at its operational speed. During operation of the disk drive the drive motor 12 rotates the disk 16 at a constant speed, and the actuator 14, which is typically a linear or rotary voice coil motor (VCM), moves the carrier 20 generally radially across the surface of the disk 16 so that the head may access different data tracks on disk 16.

Figure 9:
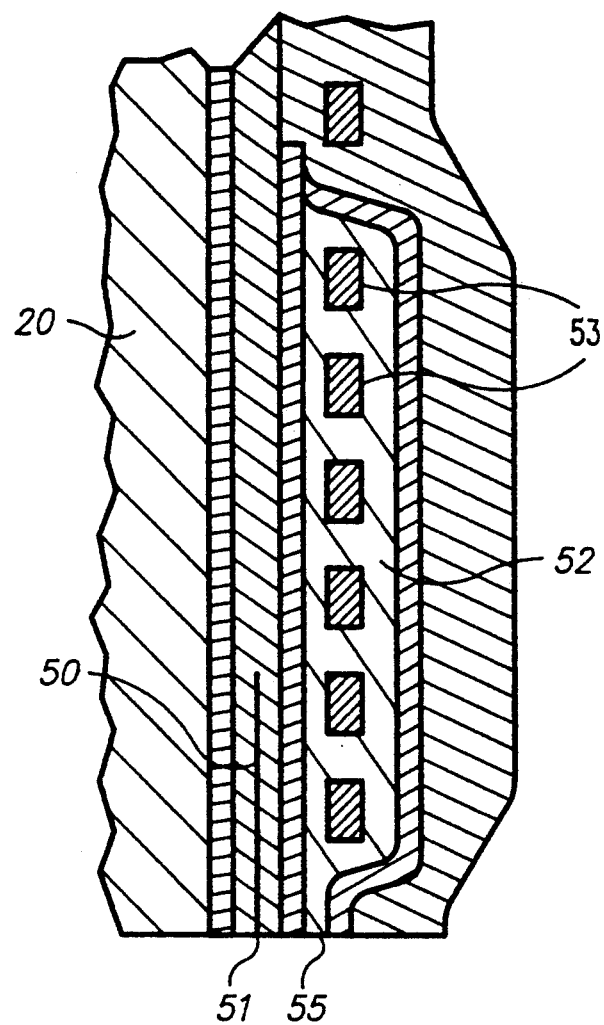
FIG. 9 is a sectional view of a thin film MR read/inductive write head for use in the present invention.
Figure 9:
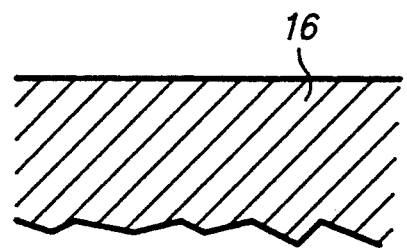

The MR read/inductive write head is a thin film head formed on the trailing edge of the carrier 20 and is shown in more detail in section in FIG. 9. Both the MR read sensor 50 and the inductive write head 52 are formed as thin films on the rear or trailing edge of the carrier 20, which serves as the substrate for the deposition of the films. The MR read sensor 50 has an end 51 and the inductive write head 52 has coil 53 (shown in section) and a gap 55. Both the end 51 of MR read sensor 50 and the gap 55 of inductive write head 52 are oriented toward the surface of disk 16 for reading and writing data. Because the inductive head 52 is not required to read data recorded in the laminated magnetic layer of disk 16, its design can be optimized for writing, even though the disk 16 may exhibit a relatively low value of $S^*$. The data detected from disk 16 by the MR sensor 50 is processed into a data readback signal by signal processing circuitry in the integrated circuit chip 30 located on arm 22 (FIG. 8). The chip 30 includes amplification and other signal processing circuitry using conventional techniques such as that described in Assignee's U.S. Pat. Nos. 4,706,138 and 4,786,993. The signals from MR sensor 50 (FIG. 9) travel via cable 32 to chip 30, which sends its output signals via cable 34.

While the preferred embodiments of the present invention have been illustrated in detail, it should be apparent that modifications and adaptations to those embodiments may occur to one skilled in the art without departing from the scope of the present invention as set forth in the following claims.

What is claimed is:

1. A magnetic recording disk drive for horizontal recording comprising:
   a magnetic recording disk having a substrate and a laminated magnetic layer formed over the substrate, the laminated magnetic layer comprising alternating films of a magnetic film of a cobalt-based alloy having platinum or nickel present in the alloy and a non-magnetic spacer film, the laminated layer having at least two of said magnetic films and one of said spacer films;
   means connected to the disk for rotating the disk;
   a magnetoresistive read head for detecting data recorded in the laminated magnetic layer on the disk;
   an inductive write head for writing data in the laminated magnetic layer on the disk; and
   means connected to the read head and the write head for moving the read and write heads across the disk.

2. A disk drive according to claim 1 wherein the disk includes a non-magnetic underlayer between the substrate and the laminated magnetic layer.

3. A disk drive according to claim 2 wherein the underlayer on the disk is formed of either chromium, molybdenum or an alloy comprising chromium and vanadium.

4. A disk drive according to claim 1 wherein the magnetic film alloy on the disk includes chromium or molybdenum.

5. A disk drive according to claim 1 wherein the non-magnetic spacer film on the disk is formed of chromium, molybdenum or an alloy comprising chromium and vanadium.

6. A disk drive according to claim 1 wherein each of the spacer films on the disk has a thickness less than approximately 80 Angstroms.

7. A disk drive according to claim 1 wherein the laminated magnetic layer on the disk has a coercivity squareness $S^*$ in the range of approximately 0.6 to 0.8.

8. A disk drive according to claim 1 further comprising means coupled to the magnetoresistive read head for processing the signal representing data detected from the disk by the read head.

9. A magnetic recording disk drive comprising:
   a magnetic recording disk for horizontal recording comprising a substrate and a laminated magnetic layer formed over the substrate, the laminated magnetic layer further comprising alternating films of a magnetic film of a cobalt-based alloy having platinum or nickel present in the alloy and a non-magnetic spacer film, the laminated layer having at least two of said magnetic films and one of said spacer films;
   a hub attached to the disk;
   a motor connected to the hub for rotating the disk;
   a magnetoresistive read sensor for reading data from the disk;
   an inductive write head for writing data to the disk;
   a carrier for supporting the read sensor and the write head;
   an actuator connected to the carrier for moving the carrier generally radially across the disk so the read sensor may access different regions of data on the disk;
   means coupled to the read sensor for processing the signal sensed from the disk by the read sensor; and
   means for supporting the motor and actuator.

10. A disk drive according to claim 9 wherein the disk further comprises a non-magnetic underlayer between the substrate and the laminated magnetic layer.

11. A disk drive according to claim 9 wherein the underlayer on the disk is formed of either chromium, molybdenum or an alloy comprising chromium and vanadium.

12. A disk drive according to claim 9 wherein the magnetic film alloy on the disk includes chromium or molybdenum.

13. A disk drive according to claim 9 wherein the non-magnetic spacer film on the disk is formed of chromium, molybdenum or an alloy comprising chromium and vanadium.

14. A disk drive according to claim 9 wherein each of the spacer films on the disk has a thickness less than approximately 80 Angstroms.

15. A disk drive according to claim 9 wherein the laminated magnetic layer on the disk has a coercivity squareness $S^*$ in the range of approximately 0.6 to 0.8.

16. A disk drive according to claim 9 wherein the carrier is an air-bearing slider and wherein the magnetoresistive read sensor is a thin film read sensor formed on the slider.

* * * * *